United States Patent Office 3,634,308
Patented Jan. 11, 1972

3,634,308
POLYALKYLENE OXIDE ADDUCT OF PHOSPHORIC ACID AS MOLD RELEASE AGENT FOR UNSATURATED POLYESTER RESINS
Glenn R. Svoboda, Grafton, and Richard C. Ross, Port Washington, Wis., assignors to Freeman Chemical Corporation, Port Washington, Wis.
No Drawing. Filed May 19, 1969, Ser. No. 825,922
Int. Cl. C08f 21/02
U.S. Cl. 260—40 R
4 Claims

ABSTRACT OF THE DISCLOSURE

An improved molding resin composition, particularly adapted for use with heated surface molding installations, includes as a mold release agent, a small quantity of a polyol which is a polyalkylene oxide adduct of phosphoric acid. The composition is otherwise typical of the molding art, i.e., includes unsaturated polyester resin syrup and inert materials which may be particulate or fibrous fillers or fibrous reinforcement materials.

BACKGROUND OF THE INVENTION

(1) Field of the invention

The present invention relates to unsaturated polyester resin molding compositions containing mold release agents.

(2) Description of the prior art

Unsaturated polyester resin compositions containing inert fillers have been used as curable molding resins in heated surface molding installations for many years. See "Polyesters and Their applications" by Bjorksten et al., Reinhold Publishing Corporation, 1956, page 110 et seq. Heated surface molding installations include the matched metal die molds and the pultrusion molds. The heated surface molds need not be made from metallic materials. Such compositions normally include mold release agents, op cit. pages 113–4. Typical mold release agents include zinc stearate, magnesium stearate and alkyl phosphates. Typical alkyl phosphate materials include those which are sold primarily for use in other industries as wetting agents by E. I. du Pont deNemours Company under the trade name Zelec.

The zinc stearate and magnesium stearate mold release agents achieve acceptable separation of the molded resin part from the heated molding surfaces; however, the part may be difficult to paint because the surface resists paint adhesion. Consequently, the coatings for the part develop objectionable blemishes. Also the molding compositions which employ the stearate mold release agents require molding temperatures of 280° F. and higher in order for the mold release agent to develop its effectiveness. Such elevated temperatures increase the expense of the molding cycle. Lower molding temperatures, e.g., 250° F., are preferred for optimum mold cycle efficiency.

At the present, the preferred mold release agents are the alkyl phosphates because they yield products which are easily and effectively paintable. The alkyl phosphates are available in two varieties, a neutralized composition known as Zelec NE which is a waxy paste, and an acidified composition known as Zelec UN, which is a liquid. The neutralized composition is undesirable because of the difficulties which are encountered in dispersing the material throughout the molding compositions. The acidic composition is easily dispersed, but it may create objectionable viscosity increases in some molding compositions, especially those compositions having high filler loadings. In other molding composition, the acidic composition may chemically react with alkaline filler ingredients and thus become inactivated.

SUMMARY OF THE INVENTION

Polyester resin molding compositions according to the present invention employ essentially neutral alkylene oxide adducts of anhydrous phosphoric acid as a mold release agent. The resulting polyester resin molding compositions do not increase significantly in viscosity and can be maintained in storage for extended periods of time without excess viscosity increase. The compositions have excellent mold release properties. The surfaces of the resulting molded articles have excellent adhesion properties for subsequent painting.

The alkylene oxide adducts of phosphoric acid are prepared by reacting an alkylene oxide, such as ethylene oxide, propylene oxide, butylene oxide, with phosphoric acid under etherification conditions. The alkylene oxide adducts are described, for example, in U.S. Pat. 3,094,549. The adducts for the present objectives are essentially neutral, i.e., have an acid value below about 5 and a molecular weight greater than about 230.

DESCRIPTION OF THE PREFERRED EMBODIMENT(S)

Example I

A typical polyester resin is prepared from 65 mols phthalic anhydride, 35 mols maleic anhydride, 103 mols of a glycol mixture containing 75 percent by weight diethylene glycol and 25 percent by weight ethylene glycol. The ingredients are cooked to a final acid number of less than 30. Thirty parts per million of hydroquinone is added as a polymerization inhibitor.

Seventy-one pounds of the described polyester resin are blended with 29 pounds of styrene. About 150 parts by weight per million, based on the resulting mixture, of tert-butyl catechol is added to the blend as a polymerization inhibitor.

The described material is typical of the unsaturated polyester resins available in the plastics industry.

Example II

A preform molding resin according to this invention was prepared from the resin of Example I by mixing Resin syrup of Example I—98.7 pounds
Additional Styrene—1.0 pound
Propylene oxide adduct of
  anhydrous phosphoric acid (see Example V)—0.3
  pound
t-Butyl catechol—1.14 grams This mixture is identified as the molding resin of Example II. The mixture contains 0.3 percent by weight of propylene oxide adduct of anhydrous phosphoric acid.

Example III

A molding composition was prepared by mixing

| | Pounds |
|---|---|
| Resin of Example II | 225 |
| Styrene | 5 |
| Finely divided calcium carbonate | 150 |
| Finely divided kaolin clay | 50 |
| Pigment paste | 6 |
| Benzoyl peroxide (2 pounds in 4 pounds of styrene) | 6 |

The viscosity of the mixture was 9200 centipoises at 25.8° C.

Example IV

The molding composition of Example III was used in a commercial matched metal mold along with a preform mat of randomly oriented glass fibers. The mold was intended to produce five inches deep tote boxes. Excellent products were produced with excellent release properties and excellent surface uniformity appearance from the molding composition of Example III.

Example V

The alkylene oxide adduct of anhydrous phosphoric acid employed in Example II was prepared by mixing 21.12 grams of 115 percent ortho-phosphoric acid with 2.37 grams deionized water to produce anhydrous phosphoric acid. This material was combined with 76.51 grams of propylene oxide. The anhydrous phosphoric acid was slowly stirred into the propylene oxide at such rate that the temperature of the mixture remained below 200° F. The final acid value was less than 1. The hydroxyl value of the adduct was 320–340.

Other oxides, such as ethylene oxide and butylene oxide, may be employed in place of all or a part of the propylene oxide. In general, the reaction product contains one mol of the anhydrous phosphoric acid and 3 to 8 mols of the alkylene oxide. Preferably about 5.6 mols of the alkylene oxide and one mol of anhydrous phosphoric acid are employed. Typical molding compositions include 1/3 parts by weight of the resin syrup; 1/3 parts by weight finely divided particulate fillers, such as calcium carbonate or clay; and 1/3 parts by weight fibrous filler, such as chopped glass fibers, asbestos and the like.

In a typical molding installation, the polyester resin syrup and the inert fillers are mixed and a small quantity of a mold release agent and catalyst are added by the molder.

The present mold release agent can be added to the polyester resin syrup by the resin formulator. The molder thereupon mixes the syrup (as received—containing the mold release agent) with the selected inert fillers for his installation.

Typical polyester molding compositions contain 25 to 90 parts by weight of unsaturated polyester resin syrup and 10 to 75 parts by weight of inert filler materials. The resin syrup includes copolymerizable ethylenically unsaturated monomers, such as styrene; vinyl toluene; divinyl benzene; acrylic and methacrylic acids and esters. The present mold release agents can be effective in concentrations of about 0.1–1.0 percent of the weight of the polyester resin syrup.

Additional examples

Three additional unsaturated polyester resin syrups were prepared corresponding to typical commercial syrups and identified as Examples VI, VII, VIII. These syrups had the compositions set forth in the following table.

COMPOSITION OF POLYESTER RESINS

| Ingredient | VI | VII | VIII |
|---|---|---|---|
| Propylene glycol, lbs | 30.30 | 21.80 | 32.91 |
| Diethylene glycol, lbs | | 11.40 | |
| Maleic anhydride, lbs | 14.74 | 17.57 | 26.97 |
| Phthalic anhydride, lbs | 33.38 | | |
| Isophthalic acid, lbs | | 29.87 | 22.81 |
| Triphenyl phosphite, g | 0.02 | | |
| Styrene, lbs | 29.0 | 30.0 | 27.21 |
| Inhibitor, g | 16.0 | 35.09 | 21.56 |
| Final acid value | 19–25 | 10–17 | 3–10 |

A further polymerizable unsaturated polyester resin syrup IX was prepared by combining the following materials:

89.10 parts by weight of the resin in Example VI;
1.0 part by weight styrene;
9.90 parts by weight of a solution containing about 20% styrene and remainder the reaction product of meth-acrylic acid and diglycidyl ether of Bisphenol-A having an epoxy equivalent of about 176.

Each of these resin syrups was combined with fillers and a catalyst and the propylene oxide adduct of phosphoric acid described in Example V. The molding compositions are described as Examples X, XI, XII, XIII and are described in the following table.

MOLDING COMPOSITION

| Resin | X | XI | XII | XIII |
|---|---|---|---|---|
| Example: | | | | |
| VI, p.b.w | 60 | | | |
| VII, p.b.w | | 67 | | |
| VIII, p.b.w | | | 66.7 | |
| IX, p.b.w | | | | 60 |
| Surfex MM, p.b.w | 40 | | | 40 |
| Benzoyl peroxide, percent | ¹1 | ¹1 | | |
| Lupersol 256, percent | | | 0.5 | 0.6 |
| Kaolin clay, p.b.w | | | 26.7 | |
| McNamee clay, p.b.w | | 33 | | |
| Microthene FN-510, p.b.w | | | 6.6 | |
| Propylene oxide adduct of phosphoric acid, percent | ¹0.3 | ¹0.3 | ¹0.5 | ¹0.3 |

¹ Percentage based on weight of the resin.
NOTE.—P.b.w.=Abbreviation for parts by weight; Surfex MM is a finely divided commercial calcium carbonate filler; Lupersol 256 is a commercial polyester resin initiator; McNamee clay is a finely divided silicate clay; Microthene FN-510 is finely divided particulate polyethylene.

Molding compositions X and XI were employed in a matched metal mold at 250° F. for a mold time of 1.5 minutes. The products showed good release from the mold.

Molding composition XII was employed in a matched metal mold at 250° F. for 2 minutes. The product showed a fair release from the mold.

Molding composition XIII was employed in a matched metal mold at 250° F. for 1 minute. The product showed good release from the mold.

Thus it appears from Examples VI through XIII that the present mold release additive performs quite satisfactorily with a variety of typical commercial unsaturated polyester resins.

A large batch of the polyester resin of Example I was prepared and divided into four aliquot portions, identified as Example II-A, II-B, II-C, II-D. Resinous molding compositions were prepared from these aliquot portions as set forth in the following table.

MOLDING COMPOSITIONS

| Components | II-A, p.b.w. | II-B, p.b.w. | II-C, p.b.w. | II-D, p.b.w. |
|---|---|---|---|---|
| Resin II | 60 | 50 | 50 | 65 |
| Surfex MM | 40 | 50 | | |
| Camelwite | | | 50 | |
| ASP-400 | | | | 35 |
| Benzoyl peroxide | 0.60 | 0.50 | 0.50 | 0.65 |

NOTE.—P.b.w. indicates parts by weight; Surfex MM and Camelwite are commercial finely divided calcium carbonate; ASP-400 is a Kaolin clay.

Each of the molding compositions II-A, II-B, II-C, II-D was divided into four aliquot portions identified by the suffix numbers 1, 2, 3, 4 wherein:

1 indicates the molding composition aliquot with no additives;
2 indicates the aliquot having 0.3 percent by weight of resin of the propylene oxide adduct of phosphoric acid as described in Example V;
3 indicates that the additive is 0.3 percent by weight of resin of Zelec UN;
4 indicates that the additive is 0.6 percent by weight of Zelec NE.

The viscosity of each of the 16 aliquot samples was tested with a L.V.F. Brookfield viscometer having a number four spindle at 25° C. The viscosity was measured at 6 r.p.m., 12 r.p.m., 30 r.p.m. and 60 r.p.m. The viscosity values, reported in centipoises, are set forth in the following table:

VISCOSITY IN CENTIPOISES

| Sample | 6 r.p.m. | 12 r.p.m. | 30 r.p.m. | 60 r.p.m. |
|---|---|---|---|---|
| II-A-1 | 6,400 | 6,300 | 6,400 | 6,270 |
| II-A-2 | 7,000 | 6,300 | 6,800 | 6,810 |
| II-A-3 | 19,500 | 14,850 | 11,000 | 9,320 |
| II-A-4 | 8,300 | 8,250 | 8,040 | 7,860 |
| II-B-1 | 10,400 | 10,400 | 10,720 | |
| II-B-2 | 11,100 | 11,050 | 11,080 | |
| II-B-3 | 41,700 | 30,200 | | |
| II-B-4 | 15,000 | 14,800 | 14,000 | |
| II-C-1 | 11,200 | 11,300 | 11,480 | |
| II-C-2 | 10,700 | 10,800 | 11,200 | |
| II-C-3 | 86,200 | | | |
| II-C-4 | 39,300 | 28,800 | | |
| II-D-1 | 24,900 | 20,100 | 16,120 | |
| II-D-2 | 22,100 | 19,000 | 15,300 | |
| II-D-3 | 30,600 | 28,500 | 17,660 | |
| II-D-4 | 28,600 | 22,300 | 17,100 | |

It will be observed from an inspection of the foregoing table that the viscosity of the molding compositions containing the additive of this invention are approxmately the same as the viscosities of the molding compositions having no additive whatsoever. Compare II-A-1 and II-A-2; II-B-1 and II-B-2; II-C-1 and II-C-2; II-D-1 and II-D-2. The four aliquot samples having Zelec UN as a mold release additive (II-A-3; II-B-3; II-C-3; II-D-3) exhibited significant increases in viscosity in all four compositions.

The aliquot samples containing the Zelec NE mold release additive (II-A-4; II-B-4; II-C-4; II-D-4) likewise showed an increase in viscosity in the molding composition in all cases.

Three aliquot samples containing the Zelec UN as a mold release agent (II-A-3; II-B-3; and II-D-3) evidenced significant decreased viscosity with increasing test speed, suggesting that the compositions are thixotropic. Thixotropy in general is undesirable in molding compositions.

INHIBITORS

Customarily polymerization inhibitors are not employed in polyester molding compositions. However, such inhibitors may be employed, if desired, as in Example II which includes t-butyl catechol as a polymerization inhibitor. The substituted catechols are a preferred inhibitor because they provide excellent room-temperature catalyzed stability for the compositions yet they are heat-labile and do not retard the polymerization of the compositions in the heated molds.

GENERAL

The present mold release agents are of especial utility in filled molding compositions which contain particulate or fibrous fillers. Nevertheless these mold release agents also are useful in unfilled compositions, e.g., the resin syrups which are employed in pultrusion processes for producing glass-filament-reinforced strips or shapes. In such installations the glass filaments may be considered for the present purposes as an inert filler. The mold release agents also are useful in unfilled resinous syrups which might be employed as a clear coating for a molded article, e.g., for synthetic marble articles.

The term unsaturated polyester resin syrup as used in this specification and claims is intended to include (a) the reaction product of at least one polyhydric alcohol and at least one polycarboxylic acid or acid anhydride, wherein at least a portion of the said polycarboxylic acid or acid anhydride consists of alpha, beta-ethylenically unsaturated dicarboxylic acid and (b) copolymerizable ethylenically unsaturated monomers. The polycarboxylic acid or acid anhydride is normally a dicarboxylic acid or anhydride such as phthalic acid, isophthalic acid, terephthalic acid, dimer acid, adipic acid, and the like. The alpha,beta-ethylenically unsaturated dicarboxylic acid or acid anhydride may include maleic acid or anhydride, fumaric acid, and the like. The copolymerizable ethylenically unsaturated monomers may include styrene, alpha methylstyrene, chlorostyrene, divinyl benzene, acrylic acid, methacylic acid, alkyl acrylates, and alkyl methacrylates, and the like. The composition of unsaturated polyester resin syrups is notoriously well known, as set forth in the book Polyesters and Their Application by Bjorksten et al. cited supra.

We claim:
1. In a curable molding composition including:
   an unsaturated polyester resin syrup including (a) the reaction product of at least one polyhydric alcohol and at least one polycarboxylic acid or acid anhydride, where at least a portion of the said polycarboxylic acid or acid anhydride consists of alpha, beta-ethylenically unsaturated dicarboxylic acid and (b) copolymerizable ethylenically unsaturated monomers,
   the improvement comprising a mold release agent uniformly dispersed throughout the composition consisting of
      0.1–1.0 percent based on the weight of the unsaturated polyester resin syrup of the adduct of (a) one mole of an anhydrous phosphoric acid having a molecular weight greater than 230, and an acid value less than 5 and (b) 3 to 8 moles of an alkylene oxide selected from the class consisting of ethylene oxide, propylene oxide and butylene oxide.
2. In a curable molding composition including:
   25–90 parts by weight of an unsaturated polyester resin syrup including (a) the reaction product of at least one polyhydric alcohol and at least one polycarboxylic acid or acid anhydride, where at least a portion of the said polycarboxylic acid or acid anhydride consists of alpha, beta-ethylenically unsaturated dicarboxylic acid and (b) copolymerizable ethylenically unsaturated monomers;
   10–75 parts by weight of filler materials;
   the improvement comprising a mold release agent uniformly dispersed throughout the composition consisting of
      0.1–1.0 percent based on the weight of the unsaturated polyester resin syrup of the adduct of (a) one mole of an anhydrous phosphoric acid having a molecular weight greater than 230, and an acid value less than 5 and (b) 3 to 8 moles of an alkylene oxide selected from the class consisting of ethylene oxide, propylene oxide and butylene oxide.
3. The improvement of claim 1 wherein the said adduct is the reaction product of one mol of anhydrous phosphoric acid and 3 to 6 mols of the said alkylene oxide.
4. The improvement of claim 2 wherein the said alkylene oxide is propylene oxide.

References Cited

UNITED STATES PATENTS 2,877,204  3/1959  Duhnkrack et al. __ 260—865 X
3,260,688  7/1966  Watanabe et al. _____ 260—2.5

WILLIAM H. SHORT, Primary Examiner

R. J. KOCH, Assistant Examiner

U.S. Cl. X.R.

260—864, 865